US010656063B2

(12) United States Patent
Daley et al.

(10) Patent No.: US 10,656,063 B2
(45) Date of Patent: May 19, 2020

(54) PRESSURE TESTING METHOD AND APPARATUS

(71) Applicant: SHELL OIL COMPANY, Houston, TX (US)

(72) Inventors: Paul Russell Daley, Houston, TX (US); Laura Tufts Meyer, Sealy, TX (US); Timothy Oren Wiemers, Houston, TX (US); Lewis Jackson Dutel, Cypress, TX (US)

(73) Assignee: SHELL OIL COMPANY, Houston, TX (US)

(*) Notice: Subject to any disclaimer, the term of this patent is extended or adjusted under 35 U.S.C. 154(b) by 304 days.

(21) Appl. No.: 15/537,810

(22) PCT Filed: Dec. 21, 2015

(86) PCT No.: PCT/US2015/067098
§ 371 (c)(1),
(2) Date: Jun. 19, 2017

(87) PCT Pub. No.: WO2016/106213
PCT Pub. Date: Jun. 30, 2016

(65) Prior Publication Data
US 2017/0363525 A1    Dec. 21, 2017

Related U.S. Application Data

(60) Provisional application No. 62/095,860, filed on Dec. 23, 2014.

(51) Int. Cl.
*G01N 3/12* (2006.01)
*G01M 3/24* (2006.01)
*G01M 3/32* (2006.01)

(52) U.S. Cl.
CPC ............... *G01N 3/12* (2013.01); *G01M 3/24* (2013.01); *G01M 3/3272* (2013.01)

(58) Field of Classification Search
CPC .......... G01N 3/12; G01M 3/24; G01M 3/3272
See application file for complete search history.

(56) References Cited

U.S. PATENT DOCUMENTS 6,279,383 B1    8/2001    Balke et al.
6,854,321 B2 *  2/2005    Amlin .................. G01M 3/025
                                                                    702/51
(Continued)

FOREIGN PATENT DOCUMENTS

EP         1074829 A1      2/2001
SU         970160 A   *   10/1982

OTHER PUBLICATIONS

English-language abstrafct for SU-970160-A, which originally published on Oct. 30, 1982. (Year: 1982).*

(Continued)

*Primary Examiner* — David A Rogers

(57) ABSTRACT

The present disclosure provides a method for conducting a pressure test on an apparatus. The method may include selecting a maximum test pressure for the pressure test, providing a first volume of liquid in the enclosed space and estimating a volume of gas in the enclosed space. The method may further include calculating a volume of additional liquid necessary to bring the enclosed space to the maximum test pressure, providing the volume of additional liquid in the enclosed space, and observing pressure of the enclosed space.

15 Claims, 2 Drawing Sheets

(56) References Cited

U.S. PATENT DOCUMENTS

| | | | | |
|---|---|---|---|---|
| 7,610,796 | B2* | 11/2009 | Thomalla | G01N 3/12 |
| | | | | 73/49.5 |
| 7,736,590 | B2* | 6/2010 | Matsuda | G01N 1/2226 |
| | | | | 422/82.08 |
| 8,727,011 | B2* | 5/2014 | Parrish | E21B 33/038 |
| | | | | 166/179 |
| 8,935,106 | B2* | 1/2015 | Balogh | G01M 3/2846 |
| | | | | 702/47 |
| 8,950,243 | B2* | 2/2015 | Pawlyk | G01M 3/22 |
| | | | | 73/40.7 |
| 9,175,539 | B2* | 11/2015 | Livesay | E21B 33/0355 |
| 2002/0120411 | A1 | 8/2002 | Fierro et al. | |
| 2003/0000693 | A1 | 1/2003 | Couren et al. | |
| 2005/0269079 | A1 | 12/2005 | Franklin | |
| 2007/0143049 | A1* | 6/2007 | Thomalla | G01M 3/2846 |
| | | | | 702/81 |
| 2009/0090164 | A1* | 4/2009 | Inman | G01F 25/0038 |
| | | | | 73/1.25 |
| 2016/0084392 | A1* | 3/2016 | Horton | F16K 11/00 |
| | | | | 137/12 |
| 2016/0334298 | A1* | 11/2016 | Hilpert | E21B 36/00 |

OTHER PUBLICATIONS

"Volume of Water Required fora Hydrotest", ENG-Tips.com Engineering Forums, Jun. 19, 2006. (Year: 2006).*

International Search Report and Written Opinion received for PCT Patent Application No. PCT/US2015/067098, dated Mar. 29, 2016, 13 pages.

\* cited by examiner

US 10,656,063 B2

PRESSURE TESTING METHOD AND APPARATUS

CROSS REFERENCE TO EARLIER APPLICATION

This application is a US national stage application of PCT/EP2015/067098, filed 21 Dec. 2015, which claims priority benefits of U.S. Provisional Application No. 62/095,860, filed 23 Dec. 2014.

FIELD OF THE INVENTION

The invention relates to a method of internally pressure testing a blowout preventer commonly used on drilling rigs and also for general internal pressure testing of pressurized vessels.

BACKGROUND

Blowout preventers used on drilling rigs for the construction of wellbores must routinely be internally pressure tested to ensure optimal operational functionality and to demonstrate integrity. Blowout preventers are commonly designed to prevent escape of fluids and gasses during the drilling of a well. In some jurisdictions, blowout preventers are tested every 10-14 days and at the transition of an operation. Water is the most common test fluid used for such pressure testing. Such pressure testing procedures are usually conducted manually, i.e. a test pump is connected to the vessel to be pressure tested, and the test pump is operated manually while volumes pumped vs. resultant pressures are manually observed. The length of time required to perform a pressure test on a blowout preventer on a rig can be unpredictable, and, in many cases, can take many hours or even days to perform. The requirement to perform such pressure tests is an interruption that delays the drilling process and adds to the overall cost of constructing the well. When conducting an internal pressure test such as when using water as the test medium, it is desired for the apparatus undergoing test to first be entirely prefilled with water.

SUMMARY

The present disclosure provides a method for conducting a pressure test on an apparatus. The method may include selecting a maximum test pressure for the pressure test, providing a first volume of liquid in the enclosed space and estimating a volume of gas in the enclosed space. The method may further include calculating a volume of additional liquid necessary to bring the enclosed space to the maximum test pressure, providing the volume of additional liquid in the enclosed space, and observing pressure of the enclosed space.

Another disclosed method of conducting a pressure test on an apparatus defining an enclosed space, may include receiving, at a programmable logic controller (PLC), a signal indicative of a maximum test pressure for the pressure test and transmitting, from the PLC, a signal to initiate movement of a first volume of liquid into the enclosed space. The method may also include estimating, via the PLC, a volume of gas in the enclosed space, and calculating, via the PLC, a volume of additional liquid necessary to bring the enclosed space to the maximum test pressure. The method may further include transmitting, from the PLC, a signal to provide the volume of additional liquid in the enclosed space, and receiving, at the PLC, a signal indicative of pressure of the enclosed space

DETAILED DESCRIPTION

Figure 1:
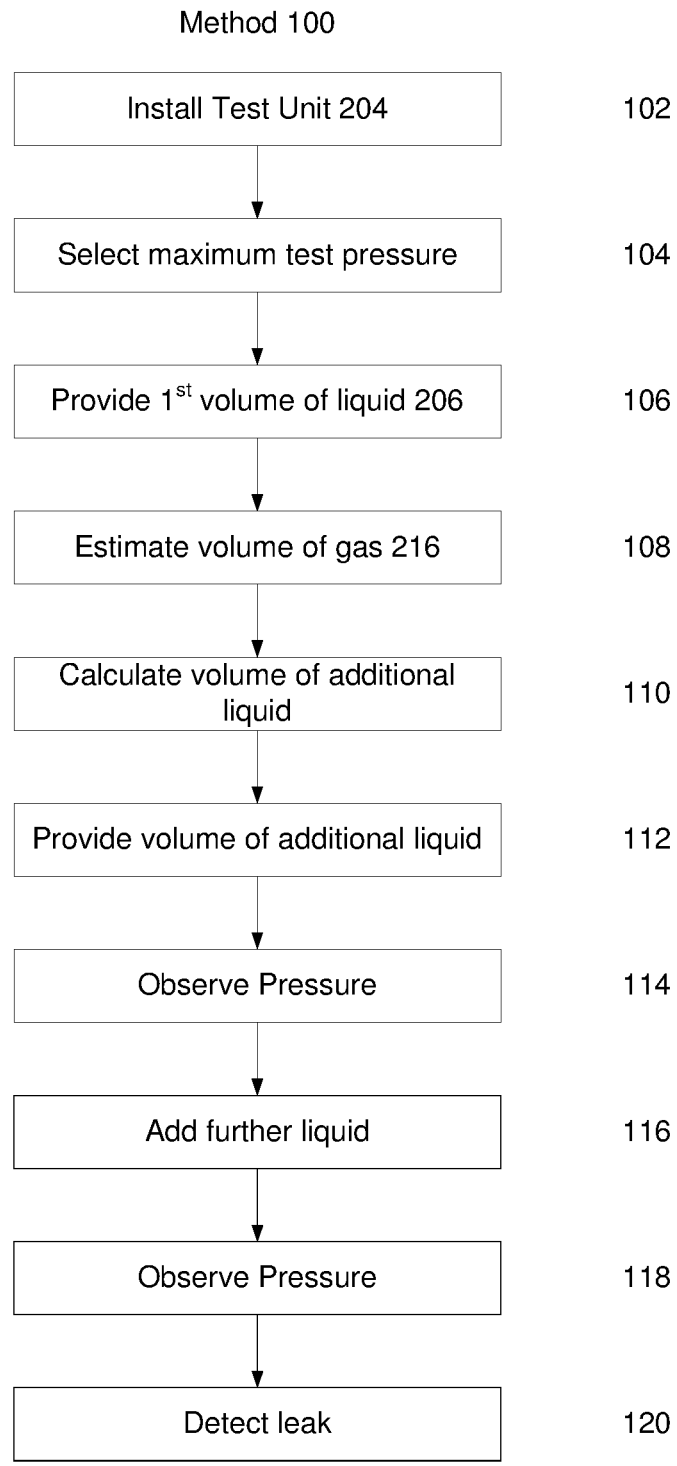
FIG. 1 is an illustration of a method of testing in accordance with the present disclosure.
Figure 2:
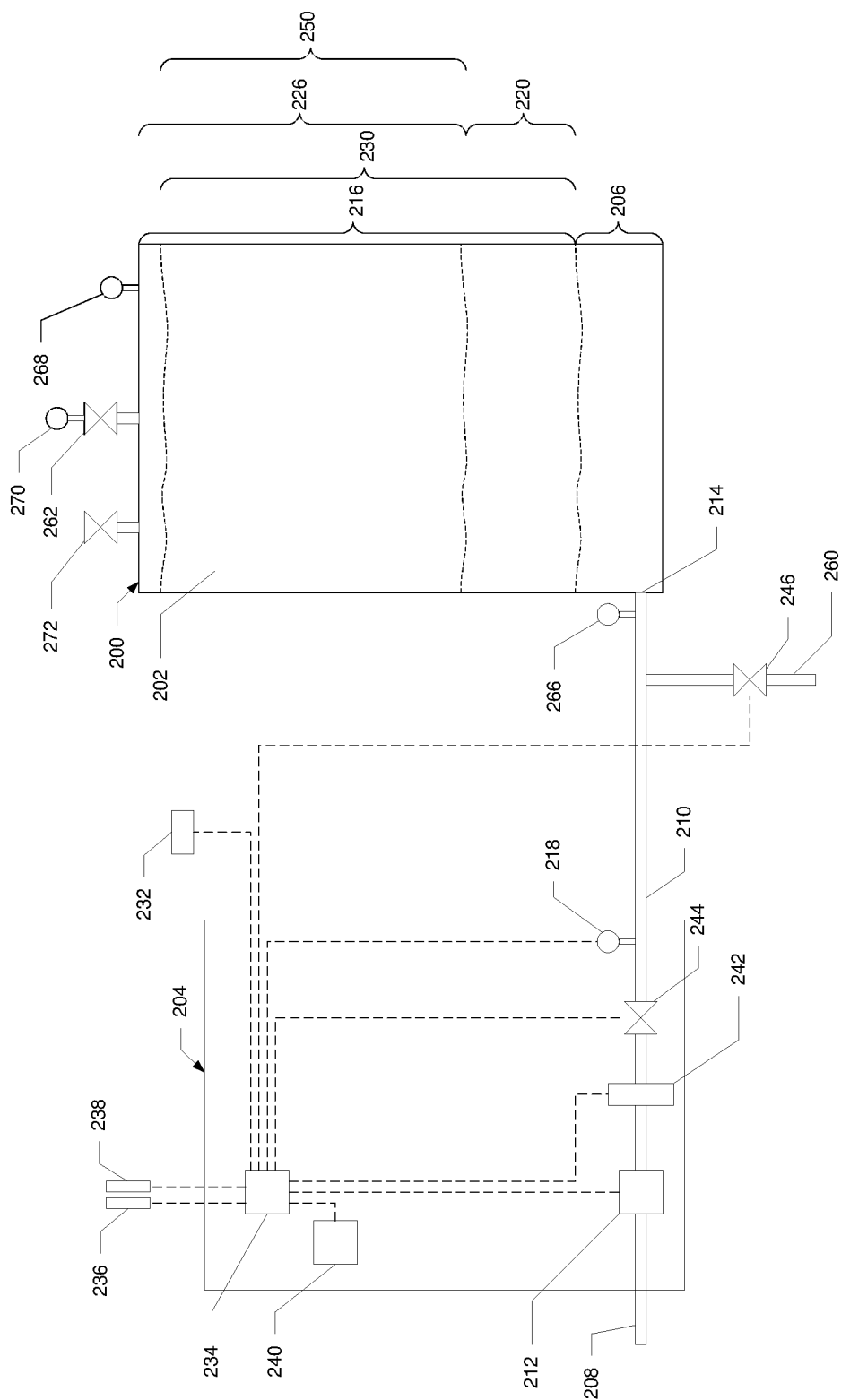
FIG. 2 is drawing of an apparatus in accordance with the present disclosure.

FIG. 1 illustrates a method 100 of conducting an internal pressure test on an apparatus 200 (shown in FIG. 2) defining an enclosed space 202 (shown in FIG. 2). For example, the apparatus 200 may be a blowout preventer (BOP). The method 100 may first involve step 102 installing a test unit 204 (shown in FIG. 2) in fluid communication with the apparatus 200. Next, the method may include step 104, selecting a maximum test pressure for conducting the pressure test of the apparatus 200. The maximum test pressure for the pressure test may correspond to an expected operating pressure of the blowout preventer or other apparatus 200 for which the pressure test may be desired. Alternatively, in some instances, the maximum test pressure for the pressure test may correspond to a pressure that is greater than the operating pressure. In some applications, it may alternatively be useful to set or otherwise select a pressure test limit that is below the anticipated operating pressure. For example, when it is known that a leak exists but the location of such leak is in question, the maximum test pressure may be selected to be a value that is a percentage of the vessel operating pressure.

As illustrated at step 106, the method 100 may further include providing a first volume of liquid 206 (shown in FIG. 2) in the enclosed space 202. Some liquid may initially be present in the apparatus 200 at the outset of the method 100, or an initial volume of liquid may first be added to the apparatus 200 in an optional additional step (not shown). Referring to FIG. 2, if the first volume of liquid 206 is added, the liquid may travel from a source 208, through a conduit 210 under the motive power of a pump 212. The conduit 210 may allow the first volume of liquid 206 to flow through an inlet 214 into the enclosed space 202 of the apparatus 200. In some instances, the first volume of liquid 206 may be metered or otherwise determined or known. However, it may not be necessary for the first volume of liquid 206 to have a known value in some circumstances. In other circumstances, the first volume of liquid 206 may be estimated based on a volume of the enclosed space 202, a volume of gas 216, or other measurements.

Referring back to FIG. 1, the method 100 may include step 108, estimating the volume of gas 216 (shown in FIG. 2) in the enclosed space 202. Estimating the volume of gas 216 may involve measuring a first pressure of the enclosed space 202, e.g., via pressure gauge 218, including where such initial pressure $P_1$ may be atmospheric or else may be greater or lesser pressure than atmospheric, then adding a second volume of liquid 220 to the enclosed space 202, measuring a second pressure of the enclosed space 202 with the second volume of liquid 220, and, based on the pressure measurements, calculating the volume of gas 216. For example, the volume of gas 216 may be estimated as follows:

$$V_{G2} = \frac{P_2 V_{L12}}{P_2 - P_1} - V_{L12}$$

Where: $V_{G2}$ is the volume of gas 216 at pressure $P_2$, $V_{L12}$ is the volume of liquid 220 added to increase to from initial pressure to the second pressure, $P_1$ is the initial pressure, and $P_2$ is the second pressure.

In some instances, step 106 may be combined with step 108, the volume of liquid may be the first volume of liquid 206, and the volume may be known by virtue of metering. In other instances, the known volume of liquid may be a second volume of liquid 220 added after the first volume of liquid 206 is already in place. In yet other instances, the volume of gas 216 may be estimated without adding any liquid. In some scenarios, the volume of the enclosed space 202 may be known and the first volume of liquid 206 may be provided to match the volume of the enclosed space 202, such that the volume of gas 216 may be estimated as zero without utilization of any pressure measurement.

If the volume of gas 216 is estimated to exceed a threshold value, a step of purging some or all of the volume of gas 216 from the enclosed space 202 may occur (not shown). Valve 272 located near the top of enclosed space 202 might be opened to allow the escape of some or all of volume of gas 216, or possibly other valves or rams (not shown) might be opened to allow the escape of some or all of volume of gas 216. The threshold value for the volume of gas 216 may be expressed in terms of the percentage of void volume of the entire enclosed space 202 (e.g. "x"% volume), or might be expressed as an absolute volume of equivalent fluid (e.g. "x" gallons), or expressed as an actual or else standard volume of gas (e.g. "x" Cubic Feet, or "x" Standard Cubic Feet), or other such description of gas quantity.

Once the first volume of liquid 206 is in place and the volume of gas 216 has been estimated, the method 100 may include step 110, calculating a volume of additional liquid 230 necessary to bring the enclosed space 202 to the selected maximum test pressure. For example, the volume of additional liquid 230 may be calculated as follows:

$$V_{L2MT} = \frac{(P_{MT} - P_2)V_{G2}}{P_{MT}}$$

Where: $V_{L2MT}$ is the volume of additional liquid 230, $V_{G2}$ is the volume of gas 216 described above at pressure $P_2$, $P_2$ is the second pressure described above, and $P_{MT}$ is the maximum test pressure described above.

The process of pressuring up described herein is a possible step in the procedural technique for approaching but not exceeding the maximum test pressure. Optionally, a calculated pressure may be selected to be very near the maximum test pressure. However, in practice, the calculated pressure might typically be selected in the range of 90% to 99% of the maximum test pressure, with such selection based on considerations such as experience operating test unit 204, the measurement accuracy of meter 242 and pressure gauge 218, etc. An objective in calculating the pressure is to not cause the actual pressure to exceed the maximum test pressure but rather to come near without exceeding the maximum test pressure.

After estimating 108 the volume of gas 216 at pressure $P_2$ and calculating 110 the volume of additional liquid 230, the method 100 may include steps 112 and 114 by pumping or otherwise providing 112 the additional volume of liquid 230 in the enclosed space 202 and observing 114 the pressure of the enclosed space 202. This may involve substeps such as providing the second volume of liquid 220, thereby increasing the pressure inside the enclosed space 202 to pressure $P_3$, and observing the resultant pressure increase in the enclosed space 202. Similar to the previous gas volume calculation, the volume of gas due to the second volume of liquid 220 may be estimated as follows:

$$V_{G3} = \frac{P_3 V_{L23}}{P_3 - P_2} - V_{L23}$$

Where: $V_{G3}$ is the volume of gas 226 at pressure $P_3$, $V_{L23}$ is the second volume of liquid 220 added to increase from pressure $P_2$ to pressure $P_3$, $P_2$ is the second pressure, and $P_3$ is the third pressure described above.

Similarly, a calculation may be performed of the volume of further liquid 250 necessary to bring the enclosed space 202 to a maximum test pressure as follows:

$$V_{L3MT} = \frac{(P_{MT} - P_3)V_{G3}}{P_{MT}}$$

Where: $V_{L3MT}$ is the volume of further liquid 250, $V_{G3}$ is the volume of gas 226 described above at pressure $P_3$, $P_3$ is the third pressure described above, and $P_{MT}$ is the maximum test pressure described above.

A comparison can then be made of the calculated gas volumes, comparing $V_{G2}$ and $V_{G3}$, converting these actual gas volumes to standard gas volumes, to determine if these standard gas volumes are closely the same value. In addition, a comparison can be made of the calculated liquid volumes, comparing $V_{L2MT}$ minus the second volume of liquid 220 against the value of $V_{L3MT}$, to verify these liquid calculations. In the event of no gas or fluid escape from enclosed space 202, then a match of these calculations may add validity to the acquired measured data.

After calculating the volume of required further liquid 250, the method may include step 116, calculating and adding the volume of further liquid 250 in the enclosed space 202 required to pressure up to the maximum test pressure $P_{MT}$. Because the volume of further liquid 250 has been estimated to increase the actual test pressure only to the maximum test pressure, an option may be to add a volume of somewhat less than the calculated further liquid 250 rapidly and with confidence that pressure $P_{MT}$ will not be exceeded.

Further liquid 250 may be provided in the enclosed space 202 until the observed pressure of the enclosed space 202 meets or exceeds the maximum test pressure.

Step 118 involves observing pressure. Close monitoring or observation might be performed most rigorously during only the final stage of the pressure test while allowing for the majority of the liquid (e.g., the first volume of liquid 206 and the second volume of liquid 220 and further liquid 250) to be added quickly, while only a small portion of the liquid (e.g., the final portions of further liquid 250) is added slowly. Such control over the time involved in the addition of liquid to the enclosed space 202 may allow the pressure test to occur much faster than with traditional methods where liquid is added slowly in comparison. Considering that a blowout preventer or other apparatus or pressure vessel typically cannot be used during a pressure test, the time savings may be significant in production through the blowout preventer or other use of the apparatus being tested.

Upon adding additional liquid, and at any time during the process of adding liquid or gasses, including when the maximum test pressure has been achieved, a leak may be detected (step 120) and/or a determination made whether to abort the test sequence.

Such detection and determination may involve adding liquids and/or gasses to enclosed space 202 and measuring the resultant pressure variation of enclosed space 202 after adding such liquids and gasses, then determining whether there is a deviation between actual measured pressures versus predicted pressures.

Alternatively, such detection and determination may involve observing the pressure over a period of time while not adding or removing fluids, for example during a period of "x" minutes and of a pressure decrease of more than a predetermined acceptable amount (e.g., "x"% of maximum test pressure or "x" psi of pressure during a time period of "x" minutes), a leak may be deemed present. Stated otherwise, detecting the leak may include observing a reduction in pressure of the enclosed space, e.g., via measurements obtained from the pressure gauge 218.

Alternatively, such detection and determination may involve calculation of the volumes of gas at varying pressures. For example, examining the calculations of gas volumes in the enclosed space 202 obtained at various pressures, or examining the calculated or measured gas to liquid ratio required to pressure test the enclosed space 202, or other similar evaluation criteria.

Alternatively, such detection and determination may involve observing one or more provided acoustic signal(s) that may be indicative of a leak, e.g., via acoustic sensor 232 and possible additional sensors which may be external to both the apparatus 200 and the test unit 204.

Once the pressure test is complete, the pressure may be released from the enclosed space 202. Test unit 204 might control valve 246 or another valve to release the pressure from apparatus 200.

Some or all of the volumes of gas may be air or other inert gas. Similarly, some or all of the volumes of liquid may be water or other liquid type.

Referring to FIG. 2, various elements may allow for appropriate monitoring and/or control during steps 114 and 116 described above, and optionally other steps. For example, some or all of the steps described above may be partially or completely automated. In one exemplary scenario, the apparatus 200 may include a pressure gauge 218 in a location suitable for monitoring pressure within the enclosed space 202. The apparatus 200 may also include a programmable logic controller (PLC) 234 in communication with the pressure gauge 218, with an input 236, with an output 238, with data and information storage 240, and/or with a liquid meter 242 (optionally combined with the pump 212). All communications are illustrated as wired. However, any or all communications may be wireless or other connections for transmission of data.

In one example of a method, the PLC 234 allows for testing of the enclosed space 202 quickly and accurately. The PLC 234 may be used in step 104 of the method 100. Specifically, the PLC 234 may determine the maximum test pressure via receipt of a signal. For example, the PLC 234 may receive a signal from the input 236 indicative of the maximum test pressure for the pressure test, where the maximum test pressure has been selected by an operator. Alternatively, the PLC 234 may determine the maximum test pressure via query of data and information storage 240 (e.g., sending a request signal and receiving a response signal). In some instances, the PLC 234 may determine the maximum test pressure by calculation using signals received from the input 236 and/or data and information storage 240 (e.g., in response to a query sent from the PLC 234). The PLC 234 may contain tables of maximum test pressures for various equipment types that the user can select or that the PLC 234 may otherwise determine based on certain inputs and choices made by the operator.

The PLC 234 may be used in step 106 of the method 100. Specifically, the PLC 234 may transmit a signal to the pump 212 to initiate the movement of the first volume of liquid 206 through the conduit 210 and into the enclosed space 202. The first volume of liquid 206 may be chosen based on the expected volume of the enclosed space 202, and may be less than the volume of the enclosed space 202. Selection of the amount of the first volume of liquid 206 may utilize the PLC 234 or may be selected otherwise. Depending on whether the first volume of liquid 206 is desired at a specific volume, the PLC 234 may receive a signal from the meter 242 indicating volume transmitted through conduit 210 or the PLC 234 may receive a signal from the pressure gauge 218 indicating a pressure within the enclosed space 202. PLC 234 may store signals from the meter 242, the pressure gauge 218, or other elements, in data and information storage 240 for later comparisons. The PLC 234 may be used to estimate the volume of gas in the enclosed space or do other calculations. For example, the PLC 234 may be used to calculate the volume of additional liquid necessary to bring the enclosed space 202 to the maximum test pressure. The PLC 234 may then transmit a signal to provide the volume of additional liquid in the enclosed space 202. The PLC 234 may receive a signal indicative of pressure of the enclosed space 202. Once the meter 242 or the pressure gauge 218 reaches a particular value, as determined by the PLC 234 via comparison of the signal from the meter 242 or the pressure gauge with a set value, the PLC 234 may instruct a valve 244 in the conduit 210 to close, the pump 212 to stop pumping, or both.

Steps 108 and 110 of the method may also utilize the PLC 234 to perform the calculations indicated above.

Step 112 of the method may also utilize the PLC 234. In a manner similar to that described above with respect to step 106, the PLC 234 may control the influx of the volume of additional liquid 230 into the enclosed space 202. Step 112, however may require metering or other monitoring of the volume of additional liquid 230 while step 106 may not require metering or monitoring during the inflow of the first volume of liquid 206 into the enclosed space 202.

The PLC 234 may be used in step 114 of the method 100. After the volume of additional liquid 230 has been added to the enclosed space 202, the pressure gauge 218 may continually monitor pressure in the enclosed space 202 as the additional liquid 230 is added at step 116. The additional liquid 230 may be added slowly, with pressure gauge 218 transmitting a signal (e.g., continuous) indicative of pressure of the enclosed space 202 which signal is received by the PLC 234, until the maximum test pressure is reached or exceeded. The PLC 234 may determine that the maximum test pressure has been reached via comparison of the maximum test pressure selected in step 104, which value may have been stored in data and information storage 240 and used as a comparison point by PLC 234. Once the maximum test pressure has been reached, the PLC 234 may instruct the valve 244 to close, and/or the pump 212 to stop. Similarly, if the pressure of the enclosed space 202 is detected by the pressure gauge 218 as being near the maximum test pressure, the PLC 234 may send a signal to the pump 212 to slow or otherwise reduce flow rate.

The PLC 234 may be used to monitor data indicative of a leak. For example, the PLC 234 may monitor data transmitted from one or more acoustic sensors 232 that detect signals associated with a leak. In another example, the PLC 234 may monitor a pressure drop associated with a leak. Specifically, after the maximum test pressure has been reached and the enclosed space is no longer receiving liquid, the pressure gauge 218 may send a continuous signal to the PLC 234 to indicate pressure. If analysis of the pressure data obtained from pressure gauge 218 indicates constant pressure over a period of time, the PLC 234 may provide a signal to the output 238 to display an indication of no leak or passed test. Alternatively, if analysis of the pressure data obtained from pressure gauge 218 indicates a decrease in pressure over a period of time, then PLC 234 may provide a signal to the output 238 to display an indication of a leak condition or a failed test. The period of time during which pressure data is analyzed by PLC 234 may be predetermined or may be adjusted in either the PLC 234, the data and information storage 240, or the input 236. PLC identification of a leak utilizing digital measured pressure data can be a faster and more accurate process than previous methods of using a chart recorder, which creates an inked line on a moving paper, thus shortening the time duration of the test.

The PLC 234 may be useful in releasing the pressure after the pressure test is complete. PLC 234 may control a control valve 246 to open to remove liquid from apparatus 200 into drain 260. Such drain off operation might be performed at the finish of the pressure test as well as in the event the pressure test procedure was otherwise aborted.

The input 236 may allow an operator to display various control and monitoring parameters. For example, input 236 may allow the operator to selectively program PLC 234 to the maximum test pressure such that the selection step 104 involves receiving, from the input 236, a maximum test pressure value. Similarly, the output 238 may allow the PLC 234 to display a message to an operator. For example, the output 238 may display a message or data indicating a leak condition, a pressure value, or other parameters.

Further, the PLC 234 may be included in a housing with the output 238 and the input 236, e.g., in the form of a laptop device.

While a blowout preventer is described as the tested device, any of a number of apparatus with enclosed space using pressure tests may benefit from the teachings herein. For example, wellheads, casings, drilling fluid pumps, cement pumps, fluid flow pipe work, fluid flow equipment such as valves, storage and transport vessels for gasses and liquids, separator vessels for gasses and liquids, fabricated chamber vessels of many types, tubing and casing joints, choke manifolds, etc. Additionally, while the enclosed space 202 is generically shown in the apparatus 200 as a single chamber, the enclosed space 202 of a blowout preventer may include a wide range of fluid chambers, conduits, valves, connectors, vessels, wellhead components, associated connections and flow lines, and control and instrument components, such as valve actuators and pressure sensors. Additionally, such enclosed spaces may be joined together by one or more piping system and may include one or more valves between multiple enclosed spaces, wherein such valves might be open or closed during particular test sequences and selection of which apparatus to pressure test at any particular time. The above scenarios might also include the use of more than one valve in series at any of the locations described.

Likewise, it should be appreciated that adding a further volume of gas in the enclosed space 202 may provide advantages. The further volume of gas may be isolated from the enclosed space 202 via membranes or otherwise.

The test unit 204 may optionally be controlled remotely, whereby a remote panel may be coupled to the test unit 204 either by wired umbilical cord or by wireless transmission. Such remote control may also include displays of information (e.g. instantaneous pump rates or cumulate pump volumes as measured by meter 242, pressure as read by pressure gauge 218, etc.) and may also display an indication of the current task being performed by PLC 234 and may also display the analyzed condition and status of the test unit 204, and may also allow for the operator of the remote panel to abort the test or otherwise modify test procedures.

The method may use multiple pumps in test unit 204, where the different pumps have different ranges of output flow rates and pressures, whereby the sequence of performing a pressure test is to first utilize a pump with a higher rate with possibly lower discharge pressure in order to fill the apparatus 200 faster, then when the pressure has increased to a certain value switch to a pump with a lower rate with possibly higher discharge pressure capability as an intermediate step or to pressure up to the maximum test pressure, then possibly once again when the pressure has increased to an even greater certain value switch to a pump with an even lower discharge rate with an even higher discharge pressure capability, etc. Such usage of multiple rate pumps may include for the reasons of speeding the overall pressure test.

The method may include, in the event there are multiple pumps in test unit 204, the selection of a certain pump based on the calculated air volume in apparatus 200.

The method may include the process of pre-filling and/or pumping at high rates and low pressures to pre-fill the apparatus 200 with water prior to closing off valves and openings in order to enclose the apparatus to begin conducting the internal pressure test.

The method may include use of fluids for pressure testing other than fresh water (e.g. Salt water, seawater, brine, glycol, glycol/water mixtures, and diesel).

The method may include the act of pressure testing apparatus 200 or other pressure vessels might at various locations other than at drilling sites. Such other locations may include at manufacturing facilities, repair shops, at tubular or other equipment storage areas, and any other such sites that are utilized for performing pressure tests.

The pumping of an incremental volume of test fluid to achieve the maximum test pressure may optionally occur after pumping the second volume of liquid 220 (rather than only after pumping first volume of liquid 206), or likewise may occur after pumping additional multiple incremental volumes and performing similar calculations in a stepwise fashion.

The determination of whether there is a leak, either of apparatus 200 or some other device connected to apparatus 200, might be performed at any step in the pressuring up or at any time during the pumping or observation process. In the event a leak is determined, the pressure test may consequently be aborted at that time.

This method may be utilized for conducting pressure tests of multiple pressure vessel apparatus simultaneously wherein all apparatus are connected and in fluid flow communication to test unit 204 simultaneously.

This method may use a remote pressure gauge 266 mounted at or near or directly onto apparatus 200 or on the outside of a valve or piping mounted onto apparatus 200, such the remote pressure gauge 266 may provide a more indicative pressure reading of apparatus 200 while pump 212 is operating, and whereby such directly mounted pressure gauge(s) would not be as subject to error due to fluid flow frictional effects while pumping into apparatus 200 as would remote pressure gauge 266 be affected if mounted onto fluid conduit 210.

This method may employ additional or multiple pressure gauges or transmitters or alternate pressure gauges or transmitters to pressure gauge 218, such as remote pressure gauge 266 located nearer to the inlet of apparatus 200, or pressure gauge 268 attached directly to apparatus 200, or pressure gauge 270 attached to one or more valves 262 that can be used for isolation of pressure gauge 270 and that are attached to apparatus 200, or such one or more pressure gauges may be of one of many configurations in which apparatus 200 is one or more vessels undergoing pressure testing and any such pressure gauges or transmitters are representative of the internal pressure in such arrangements or combinations thereof of apparatus 200. Devices utilized for measurement of pressure might be in the form of manual bourdon tube indicators or might be in the form of electronic transmitters that generate electrical signals whereby such signals are received by other devices and displayed and/or utilized by such receiving devices as input for performing calculations or programming.

This method may optionally employ a deliberately added effective volume of gas to the enclosed space 202. In such instances, the added volume of gas may coexist in the same chamber as liquids and gasses in enclosed space 202 or else may be effectively added by attaching a chamber containing a volume of gas. Such attached chamber of gas may allow the gas to be in direct contact with other gas and liquids within enclosed space 202, or the gas contained in an attached chamber of gas may be separated by a membrane from other liquids and gasses. Such deliberate addition of gas to the enclosed space 202 might be introduced for purposes of avoiding a hydraulically locked system whereby the introduction of a small incremental volume of liquid into enclosed space 202 results in a huge pressure increase within enclosed space 202.

This method may employ an acoustic device(es) for the purpose of detecting whether a leak is present and possibly to gain information regarding the location(s) of the leak(s).

This method may utilize any number of pressurization and analysis steps as previously described whereas fluid is repeatedly applied and pressure is repeatedly measured in a stepwise fashion.

This method may employ analysis techniques that utilize pressure and temperature data obtained while pumping continuously as an alternative to the previously described technique of periodically stopping the addition of fluid and taking step-wise pressure measurements of enclosed space 202.

This method may employ a technique of adding liquid in order to increase the pressure of enclosed space 202 to a calculated pressure that is a little lower than the desired maximum test pressure.

This method may employ a technique wherein calculated gas volumes are converted to 'standard' volumes corrected to atmospheric conditions of pressure and temperature (example: atmospheric standard pressure=14.7, atmospheric standard temperature=60° F., or to other such standard values for pressure and temperature) to thus aid in the comparison of calculated volumes of gas at multiple conditions as the gas is contained in the enclosed space 202 at various conditions of actual pressure and actual temperature.

This method may employ analysis techniques that consider the variation of the calculated standard gas volumes contained in the enclosed space 202 at various pressures, wherein a plot of the standard volume of gas versus time or versus volume of liquid introduced into the enclosed space 202 may result in a certain shape indicative of an equipment or process condition. As an example, a plot of the standard gas volume versus liquid introduced might be nearly flat in the event of no leaks, but may be a curved plot in the event there is a system leak. As another example, a slope change of a plot of the standard gas volume versus liquid introduced might indicate physical movement of certain components or physical changes of conditions of certain components, such as the rams of a blowout preventer moving and enlarging to a seated position as the internal pressure increases. As another example, a plot of the standard gas volume versus time while liquid is not being introduced, or also a plot of static pressure versus time while liquid is not being introduced, might indicate a change of temperature of either the liquid and/or the a change of temperature of the entire pressurized system.

This method may employ analysis techniques that also consider the effects of liquid compressibility.

This method may employ analysis techniques that consider the effects of compressibility and changes of shape of rubber or other elastomer resulting from changes in pressure and temperature.

This method may employ analysis techniques that consider the effects of expansion & contraction of apparatus 200 due to changes in pressure and temperature.

This method may employ analysis techniques that compensate for various gas compositions, for the non-ideal compressibility of a gas, and for the solubility of gas in various liquids. Such analysis techniques may include variations in compressibility and solubility versus time, temperature, and pressure, as well as fluid compositions.

The analysis of temperature changes as described herein may employ algorithms to correct for temperature variations caused by pressure changes within apparatus 200. Also, such algorithms may compensate for temperature variations due to environmental conditions including whether the test apparatus 200 is surrounded by air or otherwise may be submersed within fluid (e.g. a subsea blowout preventer located on the sea floor). Such algorithms may also compensate for the presence of one or more conduits 210 and/or may compensate for one or more apparatus 200.

This method may employ one or a combination of multiple methods for determining if there is a leak and consequently aborting the test sequence, such determination being performed either manually or else performed by a programmed device. Such criteria to be used for this determination may include, but shall not necessarily be limited to, by analysis of any single parameter or in combination with multiple measurement and analysis sources while observing the pressure of enclosed space 202, the situation of (a) a deviation of the actual measured pressure from the predicted pressure while adding liquids or gasses to enclosed space 202, (b) after adding liquids or gasses to enclosed space 202 and while enclosed space 202 is in a shut in condition, observing a decrease of the shut in pressure of enclosed space 202 during a period of time, (b) observing certain trends in the values of the calculated gas volume at various pressures using calculation techniques similar to those previously discussed, (c) obtaining one or more signal(s) from one or more acoustic or other technology device(s) so designed or otherwise emitting such a signal that may be indicative of liquid or gas leaking from enclosed space 202 or any associated apparatus so connected the device or system undergoing the pressure test.

This method may employ a mathematical volume-based algorithm calculated by the PLC 234 for the purpose of comparing the actual measured volume of fluid pumped into the enclosed space 202 versus an estimate of the total volume of the void space within the enclosed space 202, to determine if a potential problem or hazard condition may exist or otherwise to stop the pumping process. If after pumping some or all of the fluid as compared to the enclosed space 202 volume, in the event the resultant measured pressure of apparatus 200 has not increased by more than a minimum specified amount, then the PLC may halt the pumping process and alert the operator of a possible problem. Similarly, the PLC 234 may employ a time-based algorithm to possibly halt the fluid pumping process and to alert the operator in the event the allowed time has been exceeded in the event the measured pressure of apparatus 200 has not increased by more than a minimum specified amount.

As shown in FIG. 2, a pump is contained within test unit 204. This method may employ additional pumps within test unit 204 and/or pumps external to test unit 204 either in series with test unit 204 and/or in parallel with test unit 204.

Those of skill in the art will appreciate that many modifications and variations are possible in terms of the disclosed embodiments, configurations, materials, and methods without departing from their scope. Accordingly, the scope of the claims and their functional equivalents should not be limited by the particular embodiments described and illustrated, as these are merely exemplary in nature and elements described separately may be optionally combined.

We claim:

1. A method of conducting a pressure test on an apparatus defining an enclosed space, the method comprising:
    receiving, at a programmable logic controller (PLC), a signal indicative of a maximum test pressure for the pressure test;
    transmitting, from the PLC, a signal to initiate movement of a first volume of liquid into the enclosed space;
    estimating, via the PLC, a volume of gas in the enclosed space;
    calculating, via the PLC, a volume of additional liquid necessary to bring the enclosed space to the maximum test pressure;
    transmitting, from the PLC, a signal to provide the volume of additional liquid in the enclosed space;
    providing the volume of additional liquid to the enclosed space; and
    receiving, at the PLC, a signal indicative of pressure of the enclosed space.

2. A method of conducting a pressure test on an apparatus defining an enclosed space, the method comprising:
    selecting a maximum test pressure for the pressure test;
    providing a first volume of liquid in the enclosed space;
    estimating a volume of gas in the enclosed space;
    calculating a volume of additional liquid necessary to bring the enclosed space to the maximum test pressure;
    providing the volume of additional liquid to the enclosed space; and
    observing pressure of the enclosed space.

3. The method of claim 1, wherein estimating the volume of gas comprises:
    measuring a first pressure of the enclosed space;
    adding a second volume of liquid to the enclosed space; and
    measuring a second pressure of the enclosed space with the second volume of liquid; and
    based on the measurements, calculating the volume of gas.

4. The method of claim 1, comprising detecting a leak.

5. The method of claim 4, wherein detecting the leak comprises observing a reduction in pressure of the enclosed space.

6. The method of claim 4, wherein detecting the leak comprises observing an acoustic signal indicative of a leak.

7. The method of claim 4, wherein detecting the leak comprises the calculation of the volumes of gas at varying pressures.

8. The method of claim 1, comprising adding a further volume of gas in the enclosed space.

9. The method of claim 8, comprising isolating the further volume of gas from the enclosed space.

10. The method of claim 1, comprising purging a portion of the gas from the enclosed space.

11. The method of claim 1, comprising estimating the first volume of liquid.

12. The method of claim 1, wherein the volume of gas comprises air.

13. The method of claim 1, wherein the first volume of liquid and the volume of additional liquid each comprise water.

14. The method of claim 1, wherein the apparatus is a blowout preventer.

15. The method of claim 1, further comprising:
    receiving, at a programmable logic controller (PLC), a signal indicative of the maximum test pressure for the pressure test;
    transmitting, from the PLC, a signal to initiate movement of a first volume of liquid into the enclosed space;
    estimating, via the PLC, the volume of gas in the enclosed space;
    calculating, via the PLC, the volume of additional liquid necessary to bring the enclosed space to the maximum test pressure;
    transmitting, from the PLC, a signal to provide the volume of additional liquid in the enclosed space; and
    receiving, at the PLC, a signal indicative of pressure of the enclosed space.

* * * * *